(12) United States Patent
Craft et al.

(10) Patent No.: US 7,769,154 B1
(45) Date of Patent: Aug. 3, 2010

(54) AGGREGATED PERCEIVED PRESENCE

(75) Inventors: Ricardo D. Craft, Oakland, CA (US);
Cynthia Ann Hiatt, San Jose, CA (US);
Erik J. Johnson, Campbell, CA (US);
Ross E. Yakulis, Los Gatos, CA (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 12/147,355

(22) Filed: Jun. 26, 2008

Related U.S. Application Data (63) Continuation of application No. 10/865,114, filed on Jun. 9, 2004, now abandoned.

(51) Int. Cl.
*H04M 3/42* (2006.01)
(52) U.S. Cl. .................................. 379/207.12
(58) Field of Classification Search ............. 379/207.12
See application file for complete search history.

(56) References Cited

U.S. PATENT DOCUMENTS

| | | | |
|---|---|---|---|
| 4,817,130 A | 3/1989 | Frimmel, Jr. |
| 4,941,168 A | 7/1990 | Kelly, Jr. |
| 5,003,577 A | 3/1991 | Ertz et al. |
| 5,185,782 A | 2/1993 | Srinivasan |
| 5,206,903 A | 4/1993 | Kohler et al. |
| 5,329,578 A | 7/1994 | Brennan et al. |
| 5,341,414 A | 8/1994 | Popke |
| 5,371,534 A | 12/1994 | Dagdeviren et al. |
| 5,410,343 A | 4/1995 | Coddington et al. |
| 5,430,792 A | 7/1995 | Jesurum et al. |
| 5,434,908 A | 7/1995 | Klein |
| 5,511,112 A | 4/1996 | Szlam |
| 5,555,376 A | 9/1996 | Theimer et al. |
| 5,712,902 A | 1/1998 | Florence et al. |
| 5,742,763 A | 4/1998 | Jones |
| 5,802,510 A | 9/1998 | Jones |
| 5,819,084 A | 10/1998 | Shapiro et al. |
| 5,826,039 A | 10/1998 | Jones |

(Continued)

FOREIGN PATENT DOCUMENTS

EP 0886416 12/1998

(Continued)

OTHER PUBLICATIONS

U.S. Appl. No. 12/242,103, filed Sep. 30, 2008, Zmolek.

(Continued)

*Primary Examiner*—Alexander Jamal
(74) *Attorney, Agent, or Firm*—Sheridan Ross P.C.

(57) ABSTRACT

A system for controlling the presence of a user perceived by contacts is provided. In particular, a rules engine receives a number of inputs related to the desired accessibility of the user, and from such inputs generates a perceived presence for the user that can be used to control how the user is notified of an incoming communication. Inputs may include an accessibility rating assigned to a contact, the physical presence of the user, the user selected desired accessibility level, and environmental factors. The system allows a user to limit distractions from unimportant contacts or while the user is engaged in other tasks, while allowing more important contacts to have immediate access to the user.

32 Claims, 5 Drawing Sheets

U.S. PATENT DOCUMENTS

| | | |
|---|---|---|
| 5,828,747 A | 10/1998 | Fisher et al. |
| 5,864,874 A | 1/1999 | Shapiro |
| 5,905,793 A | 5/1999 | Flockhart et al. |
| 5,982,873 A | 11/1999 | Flockhart et al. |
| 5,999,611 A * | 12/1999 | Tatchell et al. ......... 379/211.02 |
| 6,018,655 A | 1/2000 | Bartle et al. |
| 6,031,896 A | 2/2000 | Gardell et al. |
| 6,038,296 A | 3/2000 | Brunson et al. |
| 6,046,762 A | 4/2000 | Sonesh et al. |
| 6,068,188 A | 5/2000 | Knowles |
| 6,088,441 A | 7/2000 | Flockhart et al. |
| 6,094,681 A | 7/2000 | Shaffer et al. |
| 6,128,304 A | 10/2000 | Gardell et al. |
| 6,130,937 A | 10/2000 | Fotta |
| 6,144,644 A | 11/2000 | Bajzath et al. |
| 6,154,738 A | 11/2000 | Call |
| 6,163,607 A | 12/2000 | Bogart et al. |
| 6,167,266 A | 12/2000 | Havinis et al. |
| 6,169,795 B1 | 1/2001 | Dunn et al. |
| 6,173,053 B1 | 1/2001 | Bogart et al. |
| 6,185,603 B1 | 2/2001 | Henderson et al. |
| 6,188,756 B1 | 2/2001 | Mashinsky |
| 6,192,122 B1 | 2/2001 | Flockhart et al. |
| 6,199,048 B1 | 3/2001 | Hudetz et al. |
| 6,226,360 B1 | 5/2001 | Goldberg et al. |
| 6,272,319 B1 | 8/2001 | Narusawa |
| 6,298,062 B1 | 10/2001 | Gardell et al. |
| 6,307,931 B1 | 10/2001 | Vaudreuil |
| 6,310,947 B1 | 10/2001 | Polcyn |
| 6,311,231 B1 | 10/2001 | Bateman et al. |
| 6,317,593 B1 | 11/2001 | Vossler |
| 6,330,243 B1 | 12/2001 | Strandberg |
| 6,330,317 B1 | 12/2001 | Garfinkel |
| 6,332,081 B1 | 12/2001 | Do |
| 6,360,222 B1 | 3/2002 | Quinn |
| 6,408,177 B1 | 6/2002 | Parikh et al. |
| 6,411,682 B1 | 6/2002 | Fuller et al. |
| 6,430,271 B1 | 8/2002 | DeJesus et al. |
| 6,430,602 B1 | 8/2002 | Kay et al. |
| 6,449,260 B1 | 9/2002 | Sassin et al. |
| 6,456,711 B1 | 9/2002 | Cheung et al. |
| 6,463,299 B1 | 10/2002 | Macor |
| 6,463,471 B1 | 10/2002 | Dreke et al. |
| 6,477,105 B2 | 11/2002 | Wu |
| 6,477,373 B1 | 11/2002 | Rappaport et al. |
| 6,477,374 B1 | 11/2002 | Shaffer et al. |
| 6,480,484 B2 | 11/2002 | Morton |
| 6,535,600 B1 | 3/2003 | Fisher et al. |
| 6,546,097 B1 | 4/2003 | Peltz |
| 6,549,612 B2 | 4/2003 | Gifford et al. |
| 6,561,805 B2 | 5/2003 | Kumar |
| 6,614,783 B1 | 9/2003 | Sonesh et al. |
| 6,636,587 B1 | 10/2003 | Nagai et al. |
| 6,665,534 B1 | 12/2003 | Conklin et al. |
| 6,668,167 B2 | 12/2003 | McDowell et al. |
| 6,675,168 B2 | 1/2004 | Shapiro et al. |
| 6,700,967 B2 | 3/2004 | Kleinoder et al. |
| 6,738,462 B1 | 5/2004 | Brunson |
| 6,741,586 B1 | 5/2004 | Schuster et al. |
| 6,750,897 B1 | 6/2004 | Moshrefi et al. |
| 6,788,773 B1 | 9/2004 | Fotta |
| 6,789,120 B1 | 9/2004 | Lee et al. |
| 6,839,735 B2 | 1/2005 | Wong et al. |
| 6,868,395 B1 | 3/2005 | Szlam et al. |
| 6,871,062 B2 | 3/2005 | Trop et al. |
| 6,879,677 B2 | 4/2005 | Trandal et al. |
| 6,879,828 B2 | 4/2005 | Virtanen et al. |
| 6,891,933 B2 | 5/2005 | Kumamoto |
| 6,925,166 B2 | 8/2005 | Chan |
| 6,968,052 B2 | 11/2005 | Wullert, II |
| 6,968,179 B1 | 11/2005 | De Vries |
| 6,988,126 B2 | 1/2006 | Wilcock et al. |
| 6,999,731 B2 | 2/2006 | Cronin |
| 7,023,971 B1 | 4/2006 | Huart et al. |
| 7,023,980 B2 | 4/2006 | Lenard |
| 7,027,586 B2 | 4/2006 | Bushey et al. |
| 7,039,040 B1 | 5/2006 | Burg |
| 7,054,939 B2 | 5/2006 | Koch et al. |
| 7,068,762 B2 | 6/2006 | Skladman et al. |
| 7,080,321 B2 | 7/2006 | Aleksander et al. |
| 7,092,370 B2 | 8/2006 | Jiang et al. |
| 7,099,867 B2 | 8/2006 | Okada et al. |
| 7,158,630 B2 | 1/2007 | Fotta et al. |
| 7,192,235 B2 | 3/2007 | Blight et al. |
| 7,215,760 B2 | 5/2007 | Lenard |
| 7,246,371 B2 | 7/2007 | Diacakis et al. |
| 7,248,677 B2 | 7/2007 | Randall et al. |
| 7,269,247 B2 | 9/2007 | Mashinsky |
| 7,283,805 B2 | 10/2007 | Agrawal |
| 7,287,056 B2 | 10/2007 | Loveland et al. |
| 7,299,259 B2 | 11/2007 | Petroyikh |
| 7,398,061 B2 | 7/2008 | Mousseau |
| 2001/0006893 A1 | 7/2001 | Yoshioka |
| 2002/0019829 A1 | 2/2002 | Shapiro |
| 2002/0021307 A1 | 2/2002 | Glenn et al. |
| 2002/0032040 A1 | 3/2002 | Tsukamoto |
| 2002/0035605 A1 | 3/2002 | McDowell et al. |
| 2002/0052225 A1 | 5/2002 | Davis et al. |
| 2002/0055350 A1 | 5/2002 | Gupte et al. |
| 2002/0065894 A1 | 5/2002 | Dalai et al. |
| 2002/0069081 A1 | 6/2002 | Ingram et al. |
| 2002/0076010 A1 | 6/2002 | Sahel |
| 2002/0076025 A1 | 6/2002 | Liversidge et al. |
| 2002/0085701 A1 | 7/2002 | Parsons et al. |
| 2002/0087630 A1 | 7/2002 | Wu |
| 2002/0098831 A1 | 7/2002 | Castell et al. |
| 2002/0116336 A1 | 8/2002 | Diacakis et al. |
| 2002/0116461 A1 | 8/2002 | Diacakis et al. |
| 2002/0126701 A1 | 9/2002 | Requena |
| 2002/0176558 A1 | 11/2002 | Tate et al. |
| 2003/0014491 A1 | 1/2003 | Horvitz et al. |
| 2003/0018720 A1 | 1/2003 | Chang et al. |
| 2003/0028621 A1 | 2/2003 | Furlong et al. |
| 2003/0073440 A1 | 4/2003 | Mukhegee et al. |
| 2003/0110228 A1 | 6/2003 | Xu et al. |
| 2003/0130864 A1 | 7/2003 | Ho et al. |
| 2003/0154251 A1 | 8/2003 | Manabe |
| 2003/0154293 A1 | 8/2003 | Zmolek |
| 2003/0195811 A1 | 10/2003 | Hayes et al. |
| 2004/0010431 A1 | 1/2004 | Thomas et al. |
| 2004/0120498 A1 | 6/2004 | Sylvain |
| 2004/0141594 A1 | 7/2004 | Brunson |
| 2004/0189698 A1 | 9/2004 | Bokish |
| 2005/0031107 A1 | 2/2005 | Fotta |
| 2005/0163104 A1 | 7/2005 | Christensen et al. |
| 2005/0187781 A1 | 8/2005 | Christensen et al. |
| 2005/0216848 A1 | 9/2005 | Thompson et al. |
| 2005/0276407 A1 | 12/2005 | Mohler |
| 2007/0121808 A1 | 5/2007 | Brunson et al. |
| 2007/0127699 A1 | 6/2007 | Lenard |
| 2008/0089488 A1 | 4/2008 | Brunson et al. |

FOREIGN PATENT DOCUMENTS

| | | |
|---|---|---|
| EP | 0930592 | 7/1999 |
| EP | 1259053 | 11/2002 |
| EP | 1261179 | 11/2002 |
| JP | 05-260188 | 10/1993 |
| JP | H8-23577 | 1/1996 |
| JP | 9-200813 | 7/1997 |
| JP | H11-046377 | 2/1999 |
| JP | 11-088495 | 3/1999 |
| JP | H11-187454 | 7/1999 |
| JP | H11-205837 | 7/1999 |

| | | |
|---|---|---|
| JP | 2000-102059 | 4/2000 |
| JP | 2000-312258 | 11/2000 |
| JP | 2001-189774 | 7/2001 |
| JP | 2001-224075 | 8/2001 |
| JP | 2001-251395 | 9/2001 |
| JP | 2001-251682 | 9/2001 |
| JP | 2001-350782 | 12/2001 |
| JP | 2002-094614 | 3/2002 |
| JP | 2002-101155 | 4/2002 |
| JP | 2002-108794 | 4/2002 |
| JP | 2002-152335 | 5/2002 |
| JP | 2002-176449 | 6/2002 |
| JP | 2003-8655 | 1/2003 |
| JP | 2003-116175 | 4/2003 |
| JP | 2003-517781 | 5/2003 |
| JP | 2003-169147 | 6/2003 |
| JP | 2003-196469 | 7/2003 |
| JP | 2003-296556 | 10/2003 |
| JP | 2004-013303 | 1/2004 |
| JP | 2004-30371 | 1/2004 |
| WO | WO 97/24010 | 7/1997 |
| WO | WO 98/03923 | 1/1998 |
| WO | WO 98/12644 | 3/1998 |
| WO | WO 00/39964 | 7/2000 |
| WO | WO 00/69140 | 11/2000 |
| WO | WO 01/45368 | 6/2001 |
| WO | WO 01/55915 | 8/2001 |
| WO | WO 01/69387 | 9/2001 |
| WO | WO 02/30105 | 4/2002 |
| WO | WO 02/093959 | 11/2002 |
| WO | WO 03/025776 | 3/2003 |
| WO | WO 03/054717 | 7/2003 |
| WO | WO 03/096559 | 11/2003 |
| WO | WO 03/085539 | 10/2006 |

OTHER PUBLICATIONS

U.S. Appl. No. 12/242,432, filed Sep. 30, 2008, Brunson et al.
U.S. Appl. No. 12/242,458, filed Sep. 30, 2008, Brunson et al.
U.S. Appl. No. 12/242,484, filed Sep. 30, 2008, Brunson et al.
U.S. Appl. No. 12/242,504, filed Sep. 30, 2008, Brunson et al.
U.S. Appl. No. 12/242,538, filed Sep. 30, 2008, Brunson et al.
U.S. Appl. No. 12/243,009, filed Sep. 30, 2008, Brunson et al.
U.S. Appl. No. 10/865,114, filed Jun. 9, 2004, Craft.
U.S. Appl. No. 11/542,295, filed Oct. 3, 2006, Somani.
U.S. Appl. No. 11/626,217, filed Jan. 23, 2007, Coughlan.
Andy Zmolek; "SIMPLE and Presence: Enterprise Value Propositions," Avaya presentation, 16 pages, presented Jan. 24, 2002.
Atkins et al "Common Presence and Instant Messaging: Message Format," Network Working Group (Jan. 9, 2003), available at http://www.ietf.internet-drafts/draft-ietf-impp-cpim-msgfmt-06.txt, 31 pages.
Berners-Lee et al.; "Uniform Resource Identifiers (URI); Generic Syntax," Network Working Group, Request for Comments 2396 (Aug. 1998), 38 pages.
Bill Michael, "The Politics of Naming" www.cConvergence.com (Jul. 2001) pp. 31-35.
CC News: Call Center Technology, "FaceTime gives voice, vision to instant messaging", available at http://www.ccnews.com/may2000/depts/cct/cctstory2.htm, 2 pages; Copyright 2000, 1999.
Chavez et al., "Interactive Applications of Personal Situation-Aware Assistants", Computers and Graphics, Pergamon Press LTD., Oxford, GB, vol. 23, No. 6, Dec. 1999, pp. 903-915, XP 004187839, ISSN: 0097-8493.
CommWeb.com "Enterprise Customer Interfaces: Application Messaging Via Instant Messaging" (Dec. 9, 2002), available at http://www.commweb.com/article/COM20021209S0001/2, 3 pages.
CosmoCall Universe™, "The Carrier-Grade, All-IP Contact Center Platform for Next Generation Network-Based Services" (2002) 3 pages.
CosmoCall Universe™, "The Next Generation IP Contact Center Platform", available at http://www.cosmocom.com/ProductInfo/Product.htm, 18 pages, 1997-2003.
Crocker et al. "Common Presence and Instant Messaging (CPIM)," Network Working Group (Aug. 14, 2002), available at http://www.ietf.internet-drafts/draft-ietf-impp-cpim-03.txt, 33 pages.
Dawson et al.; "Vcard MIME Directory Profile," Network Working Group (Sep. 1998), available at http://www.ietf.org/rfc/rfc2426.txt?number=2426, 40 pages.
Day et al. "A Model for Presence and Instant Messaging," Network Working Group (Feb. 2000), available at http://www.ietf.org/rfc/rfc2277.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
e-Vantage Solutions, "Customer Service Window", available at http://www.evgl.com/dsw.html, 2 pages, 2003.
FaceTime Communications Press Release, "Amica Insurance Selects FaceTime Communications to Provide Instant Messaging-Based Customer Service in Enterprise" (Jun. 25, 2001), available at http://www.factime.com/pr/pr010625.shtm, 2 pages.
FaceTime Communications website, "Customer Services", available at http://www.facetime.com/custsvcs.shtm, 4 pages, 2003.
FaceTime Communications website, "Overview", available at http://www.facetime.com/solutions.shtm, 4 pages, 2003.
FaceTime Communications website, "Presence Management", available at http://www.facetime.com/presence.shtm, 3 pages, 2003.
Fielding et al.; "Hypertext Transfer Protocol—HTTP/1.1," Network Working Group, Request for Comments 2068 (Jan. 1997), 152 pages.
G. Klyne et al., "Instant Messaging using APEX", Network Working Group, Jun. 1, 2001, 19 pages.
G. Klyne; "A Syntax for Describing Media Feature Sets," Network Working Group (Mar. 1999), available at http://wvvw.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Grigonis, Computer Technology Encyclopedia (2000) pp. 342-345, 389-392.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
J. Rosenberg et al., "SIP extensions for Instant Messaging", Internet Engineering Task Force, Jul. 18, 2001, 22 pages.
MIT Project Oxygen, "Oxygen: Pervasive, Human-Centered Computing" MIT Laboratory for Computer Science, MIT Artificial Intelligence Laboratory (May 2002).
Ovisoft Technologies, "Ovisoft Messenger—Call Center Solutions", available at http://www.ofisoft.com/solutioncallcenter.htm, 1 page, 2003.
Richard Grigonis, Computer Telephony Encyclopedia (2000) pp. 367-375.
Richard Grigonis,. Computer Telephony Encyclopedia (2000) pp. 413-430.
Richard Shockey, 'ENUM: Phone Numbers Meet the Net' www.cConveroence.corn (Jul. 2001) pp. 21-30.
Rose et al.. "The APEX Presence Service," Network Working Group (Jan. 14, 2002), available at http://www.ieff.org/internet-drafs/draft-ielf-apex-presence-06.txt, 31 pages.
Salvator, Dave, "Review: Skype Voice Chat", Available at http://www.findarticles.com/p/articles/mi_zdext/is_200310/ai_zifff109903>, Extreme Tech, Oct. 2003, 2 pages.
Schulzrinne, H., et al., "The Session Initiation Protocol: Internet-Centric Signaling", IEEE Communications Magazine (Oct. 2000), vol. 38, No. 10, pp. 134-141.
Stephanie Losi, "Instant Messaging for Call Centers Leaves 'Em Smiling" www.CRMDaily.com (Jun. 4, 2001), available at http://www.newsfactor.com/perl/story/10246.html, 3 pages.

Steve Taylor et al., "SIP in the call center" Network World Convergence Newsletter (Aug. 27, 2003), available at http://www.nwfusion.com/newsletters/converg/2003/0825converge2.html, 4 pages.

Sugano et al, "Common Presence and Instant Messaging (CPIM) Presence Information Data Format," Network Working Group (Dec. 2002), available at http://www.lettorofintemet-drafts/draft-letf-impo-cnim-oidf-07.bct, 26 pages.

The MIT Oxygen Project, Cambridge, MA, Apr. 25-26, 2000.

Trudy Walsh, "Instant messaging boosts service at Texas call center" GCN (Nov. 2001), available at http://www.gcn.com/cgi-bin/udt/im.display.printable?client.id=state2&story.id=16765, 2 pages.

Venus Valley, "Live chat for your website", Available at http://www.pppindia.com/vvchat/shots.htm>, Venus Valley Live Support, 2003, 2 pages.

WiredRed News Release, "WiredRed to Provide Secure Instant Messaging for Eight New Call Center Customers", available at http://www.wiredred.com/news_release_callctr.html, 2 pages, Sep. 28, 2002.

XML-NS Tim Bray et al., "Namespaces in XML", W3C recommendation: xml-names, Jan. 14, 1999, 12 pages.

"Phone Mail Override for Incoming Calls", IBM Technical Disclosure Bullitin, vol. 37, No. 11, Nov. 1994.

"CallWave Launches Mobile Call Screening and Mobile Call Transfer for Cell Phones; First Network-Independent VoIP Application to Deliver wireless/Wireline Convergence"; Callwave, Inc.; Internet Article printed from http://investor.callwave.com/phoenix.zhtml?c=180005&p=irol-newsArticle_print&ID=651; Dec. 7, 2004; 2 pages.

Official Action for U.S. Appl. No. 10/865,114, mailed Oct. 18, 2005, pp. 1-18.

Official Action for U.S. Appl. No. 10/865,114, mailed Mar. 9, 2006, pp. 1-16.

Advisiory Action for U.S. Appl. No. 10/865,114, mailed May 17, 2006, pp. 1-4.

Notice of Panel Decision from Pre-Appeal Brief Review for U.S. Appl. No. 10/865,114, mailed Aug. 17, 2006, pp. 1-2.

Examiner's Answer to Appeal Brief for U.S. Appl. No. 10/865,114, mailed Dec. 27, 2006, pp. 1-18.

Notice of Allowance for U.S. Appl. No. 10/865,114, mailed Jul. 10, 2008, pp. 1-7.

Okuyama et al., "Instant Message Technique for Supporting New Mobile Service", Fuzitsu, Fuzitsu Inc., Jul. 13, 2001, vol. 52, the fourth number, pp. 262-267 (translated abstract).

* cited by examiner

AGGREGATED PERCEIVED PRESENCE

CROSS REFERENCE TO RELATED APPLICATIONS

This application is a continuation of application Ser. No. 10/865,114, filed Jun. 9, 2004 now abandoned, the entire disclosure of which is hereby incorporated herein by reference in its entirety.

FIELD OF THE INVENTION

The present invention is directed to providing a perceived presence in response to attempts to establish communication with a user. In particular, the present invention is directed to providing a different level of perceived presence in response to different communication situations, and to adjusting a level of perceived presence in response to changed conditions.

BACKGROUND OF THE INVENTION

A wide variety of communication forms are available to users. For example, in a typical office environment, a user may be contacted by telephone, email, instant messages, and messages left in various mailboxes. In order to better manage their time, users need to restrict which communications they receive and when they receive communications.

Conventional solutions for managing a user's availability through different communication streams include filters to block unwanted communications. However, such filters are typically binary in nature. For instance, a telephone can be placed in a do not disturb setting, according to which all incoming calls will be routed to voice mail. As yet another example, in connection with instant messaging, a user can be either present in the system or not. As still another example, a communications device or application associated with a communications channel can be off or on. Accordingly, conventional systems allow a user to either enable all communications using a selected communications channel, or disable all such communications.

As a further example, messages from specific senders can be blocked or routed to alternate mailboxes using mail delivery options provided as part of conventional email systems. Even in connection with systems that allow selective filtering, enabling or disabling the filter is a cumbersome process that is not practical to frequently reconfigure, for example in response to changes in the user's environment that may occur during the course of a day.

Accordingly, conventional communications systems must be administered individually. In addition, such systems implement static filters or blocking mechanisms. That is, changes to filter or blocking parameters are only made in response to direct user intervention. Accordingly, manipulation of available filter mechanisms in response to changes in a user's activities are impractical or impossible. For example, managing a number of communication channels to provide desired levels of accessibility in response to whether the user is in a meeting, on a phone call, needing quiet time, or being completely available, has been impractical or impossible. Such systems have also been limited in their ability to allow only communications from selected senders to pass while blocking communications from other senders.

SUMMARY OF THE INVENTION

According to embodiments of the present invention, a user's level of accessibility or perceived presence can be varied as the user's needs or activities change. In addition, embodiments of the present invention allow a user to select different accessibility ratings for different contacts. In accordance with embodiments of the present invention, the accessibility of a user may be automatically varied according to the user's physical presence or location, and according to environmental factors, such as whether the user is participating in a meeting, engaged in another communication, the time of day, or other factors. The physical presence, environmental factors, and the user selected desired accessibility are provided to a rules engine, together with the accessibility rating associated with a contact, to generate a perceived presence for the user. That is, the presence of a user as seen or perceived by a contact is adjusted according to the presence level that a user wants the contact to see, which is not necessarily the user's true presence. Furthermore, the perceived presence of a user may be different for different contacts.

In accordance with embodiments of the present invention, the perceived presence of a user determines how an incoming communication will be treated. For example, if the user's perceived presence is "not available," no attempt will be made to notify the user in real-time of an incoming communication. As another example, if a user's perceived presence is "fully available," the user will be notified in real-time of any incoming communication. In accordance with still another example, a user may have an intermediate level presence. In accordance with an intermediate level of presence, a user may be notified of certain communications in real-time, but not notified in real-time of other communications. Distinctions between communications that the user will be notified of in real-time and other communications can be made based on, for example, the communication channel used for the communication, the identity of the originator of the communication, and/or the level of urgency attributed to the communication by the originator. In accordance with additional embodiments of the present invention, exceptions can be maintained for selected contacts or communications media. For example, an attempt to notify the user of a communication from a contact designated as always having full access to the user may always be made. As another example, the user may designate contacts whose communications are never allowed to interrupt the user. The perceived presence of a user may also determine through what communications devices or applications an attempt to notify a user of an incoming communication are made. For instance, if a user is in a meeting and has an intermediate level of presence with respect to an incoming communication, a call to the user's cell phone may result in an instant message displayed on the user's personal digital assistant, but no ring on the user's cellular telephone.

In accordance with embodiments of the present invention, accessibility ratings associated with contacts may be modified in response to a detected number of communications between the user and the contact. For example, the accessibility ranking of a contact may be automatically promoted by the system if the user frequently communicates with that contact. In accordance with other embodiments of the present invention, the accessibility ranking selected by a user for association with a contact will not be modified except by direct user input.

In accordance with embodiments of the present invention, the perceived presence of a user is determined by a rules engine. Inputs to the rules engine may include selections made by a user with respect to a desired level of accessibility and with respect to accessibility rankings associated with contacts. In addition, the rules engine may receive input regarding environmental factors, such as whether the user is in a meeting, or whether the current time is within normal working hours. Information regarding environmental factors may be provided to the rules engine by calendar applications, including a personal calendar associated with the user. In accordance with other embodiments of the present invention, the rules engine receives input regarding the physical presence of the user. For example, information may be provided regarding which communication devices are available to the user, or whether the user is in a location at which an attempt at real-time notification of an incoming communication should not be made. From the various inputs, a perceived presence is aggregated.

DETAILED DESCRIPTION

Figure 1:
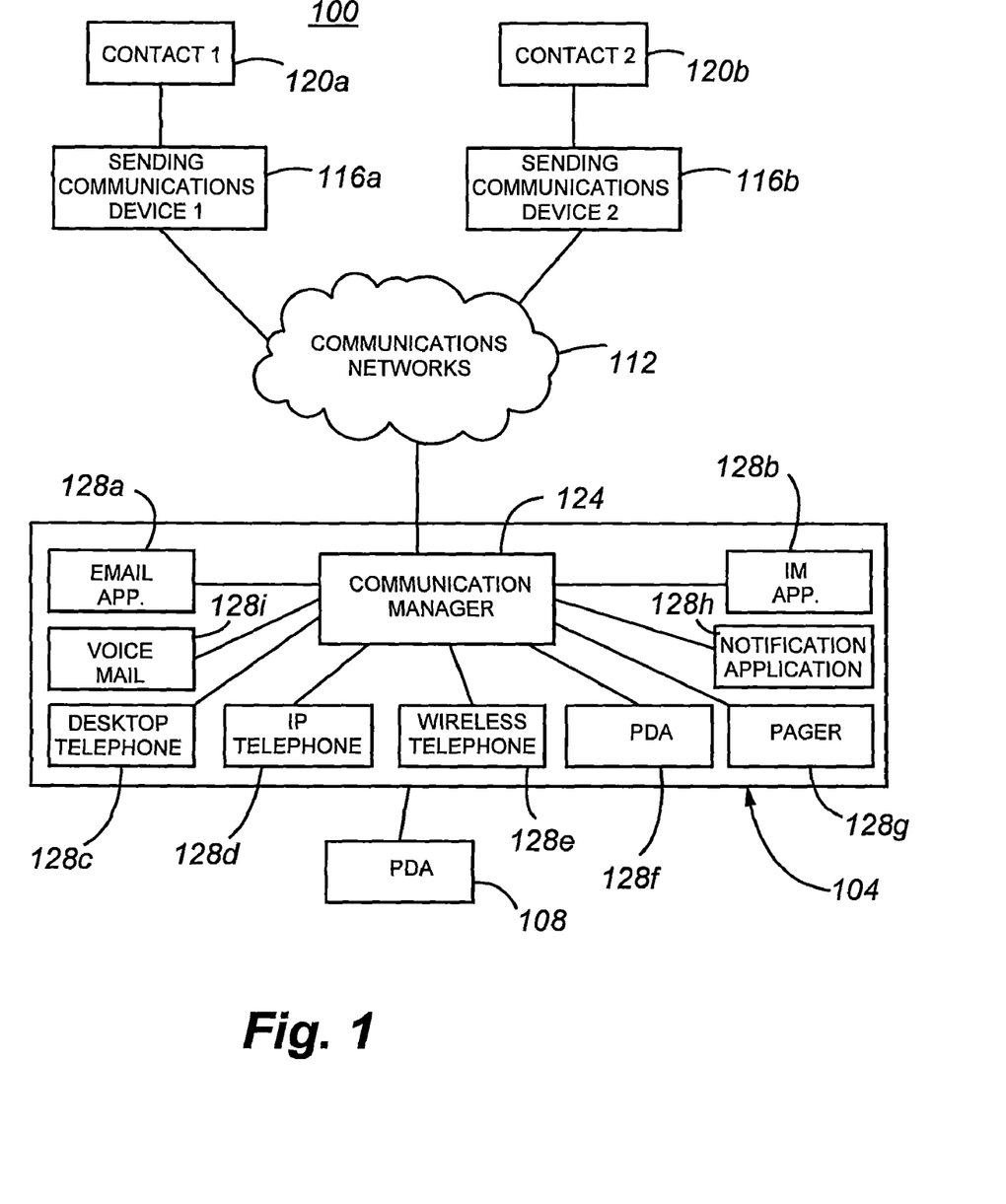
FIG. 1 is a block diagram of a system in which a perceived presence is provided to contacts in accordance with an embodiment of the present invention.

With reference now to FIG. 1, a system 100 incorporating a perceived presence subsystem 104 in accordance with embodiments of the present invention is illustrated. The perceived presence subsystem 104 is typically associated with a user 108. In addition, the system 100 includes one or more communications networks 112 that interconnect a number of sending communications devices 116 (e.g., first sending communications device 116a and second sending communications device 116b). Typically, each sending communications device 116 is associated with a corresponding contact person 120.

The perceived presence subsystem 104 may include a communications manager 124 and one or more communications devices or applications 128. As illustrated in FIG. 1, examples of communications devices or applications include an email application 128a and an instant messaging application 128b. As can be appreciated by one of skill in the art, an email application 128a or an instant messaging application 128b may run on a variety of platforms, including general purpose computers, personal digital assistance (PDAs) or wireless telephones. Further examples of communications devices or applications 128 include a desk top telephone 128c, an IP telephone 128d, which may include a stand-alone device or a device implemented through a general purpose computer, a wireless telephone 128e, a personal digital assistant (PDA) 128f, and a pager 128g. Still other examples of communications devices or applications include a notification application 128h for providing visual and/or audible notification of communications, for instance through a computing platform, and a voice mail application 128i, which may be provided by a telephony service provider or by a device associated with the user.

As depicted in FIG. 1, communications with various communications devices and/or applications 128 associated with the user 108 may be made through the communications manager 124. Alternatively or in addition, communications need not be through the communications manager 124, however notification of a communication directed to a communications device 128 is generally provided to the communications manager 124 so that the communications manager 124 can generate a perceived presence that is to be applied to the incoming communication.

The communications networks 112 may be any communication network over which a communication channel to a communication device 128 associated with the user 108 may be established. Accordingly, examples of a communication network 112 include the public switched telephony network (PSTN), a wide area network (WAN), such as a the Internet, a local area network (LAN), a private branch exchange (PBX), a wireless communication network, a paging network, and various combinations of different networks. In general, the particular communication network 112 is determined by the sending communications device 116 and by the receiving communications device 128.

Figure 2:
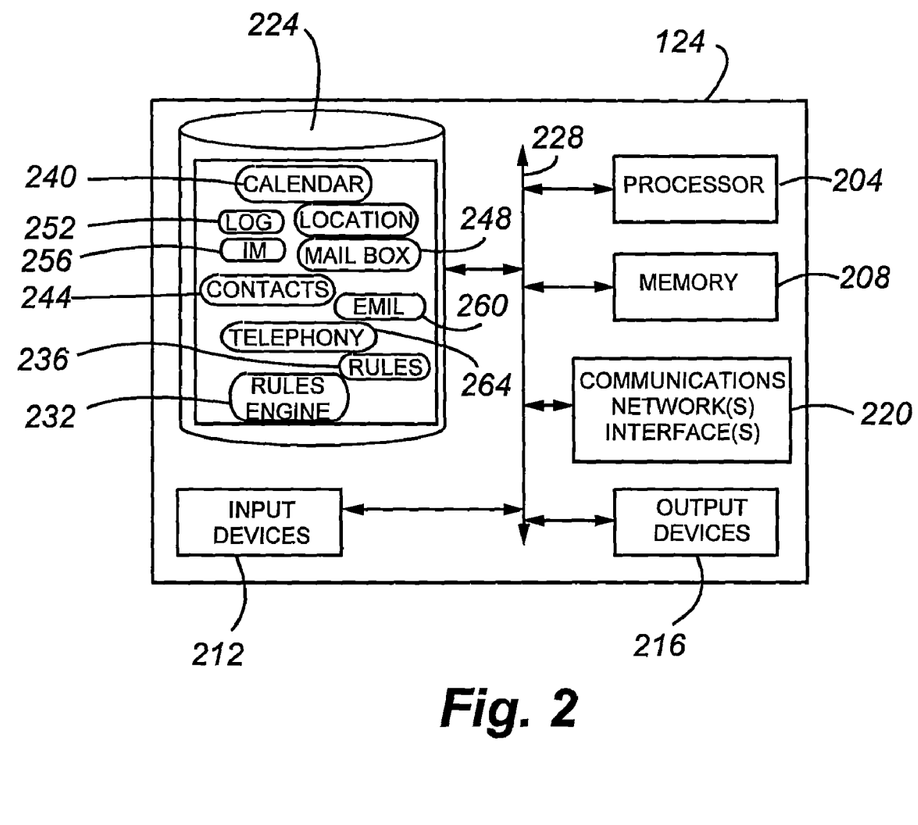
FIG. 2 is a block diagram of an apparatus suitable for providing a perceived presence to contacts in accordance with an embodiment of the present invention.

With reference now to FIG. 2, a communications manager 124 in accordance with embodiments of the present invention is depicted. The communications manager 124 may comprise a general purpose programmable computer or device. Accordingly, the communications manager 124 may include a processor 204, memory 208, an input device 212, an output device 216, a communications network interface 220, and data storage 224. The communications manager 124 may also include a communication bus 228 to enable communications between the various components.

The processor 204 may include any general purpose programmable processor or controller for executing application programming or instructions. Alternatively, the processor 204 may comprise a specially configured application specific integrated circuit (ASIC). The processor 204 generally functions to run programming code implementing various of the functions performed by the communications manager 124, including the generation of a perceived presence as described herein.

The memory 208 may be provided for use in connection with the execution of programming by the processor 204, and for the temporary or long-term storage of data or program instructions. The memory 208 may comprise solid state memory, such as DRAM and SDRAM. Where the processor 204 comprises a controller, the memory 208 may be integral to the processor 204.

Examples of input devices 212 include a keyboard and a pointing device. Examples of output devices 216 that may be associated with a communications manager 124 include a video display.

The communications network interface 220 may serve to interconnect the communications manager 124 to one or more communications networks 112. For example, where a communications manager 124 is involved with the monitoring of communications addressed to one or more communications devices 128, the communications network interface 220 supports interconnections to the appropriate communications networks 112, and/or to each such communications device 128 directly. Furthermore, a number of communication network interfaces 220 may be provided as part of a communications manager 124 to support the various connections between the communications manager 124 and one or more communication networks 112 and one or more communication devices 128. Accordingly, examples of communication network interfaces 220 include Ethernet, IEEE 802.11, universal serial bus (USB), IEEE 1394, tip/ring, or other interface.

The data storage 224 may provide storage for application programming and data. For example, application programming stored in the data storage 224 may include a rules engine 232. In addition, the data storage 224 may provide storage for rules 236 that are applied in connection with the operation of the rules engine 232. As further examples, programming for implementing a calendar application 240 and contacts or address list information 244 may be provided. Application programming for implementing various communication functions may also be maintained in the data storage 224. For instance, a mailbox application 248 and call or message log application programming 252 may be stored. Application programming for implementing or providing various communication functions may also be maintained in data storage 224. For example, instant messaging 256, email 260 or telephone (such as a soft telephone) 264 applications may be stored in data storage 224. Application programming for determining a location 268 of a user, for example in connection with a wireless network or other system capable of providing location information may also be maintained in data storage 224.

Figure 3:
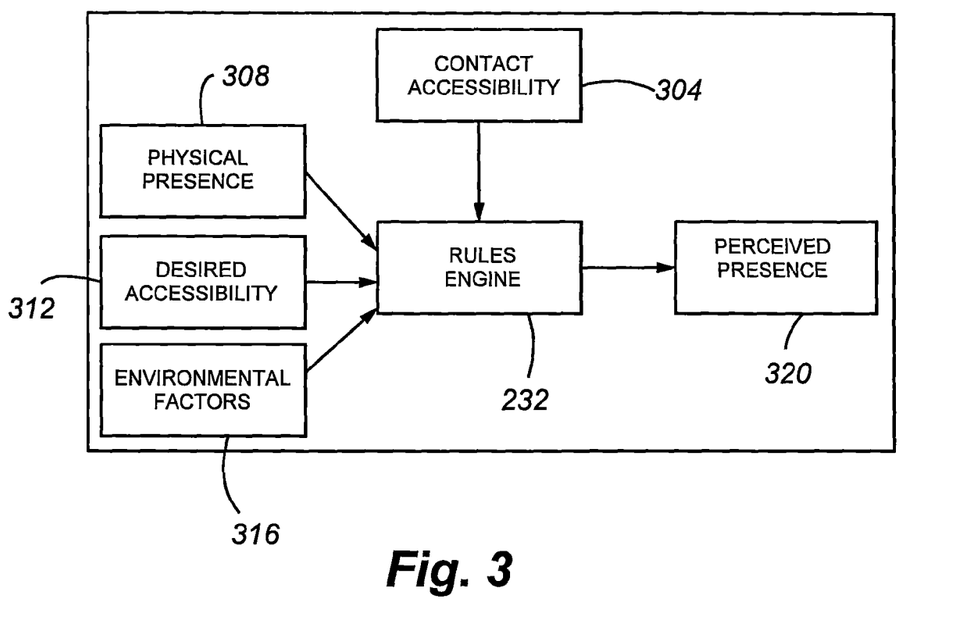
FIG. 3 is a functional block diagram illustrating the inputs and the output of a rules engine in accordance with embodiments of the present invention.

With reference now to FIG. 3, the inputs to and output from a rules engine 232 in accordance with embodiments of the present invention are illustrated. In general, inputs to the rules engine 232 may include contact accessibility 304, physical presence 308, desired accessibility 312, and environmental factors 316. Based on such inputs, the rules engine 232 generates a perceived presence 320 that is used to determine the presence of a user with respect to a particular incoming communication.

Contact accessibility 304 relates to the accessibility rating of a contact associated with a communication device 116 initiating a communication or otherwise identified as making an attempt to contact the user (hereinafter referred to as a contact or caller). An accessibility rating for an individual may therefore be assigned by the user or by an administrator. An accessibility rating may also be associated with a contact automatically, for example based on the number of previous real-time communications between the contact and the user. Other examples of criteria that may be used to automatically assign an accessibility rating include information related to an entity associated with the sending communication device 116, the location or region from which the communication originated, or any other information that can be obtained in connection with the receipt of incoming communication. A contact accessibility rating can also be assigned by default. For instance, contacts associated with entries in a calendar application 240 maintained by the user may by default be assigned a particular contact accessibility rating, which can then be modified by the user as desired. Contacts that are not associated with the user by an entry in a calendar application 240 or otherwise may be assigned a second accessibility rating by default. The association of a contact accessibility rating with different contacts allows the user to control the accessibility or the presence of the user perceived by a contact, based on the identity of the contact. Examples of selections that can be made by a user include assigning a high accessibility ranking to a spouse, child or boss, a moderate accessibility rating to a coworker, and a low accessibility rating to a salesperson. Therefore, according to the selections made, a user can ensure that some selected contacts will always or usually perceive a high level of user presence, while other selected contacts will always or usually perceive a low level of user presence.

The physical presence 308 of the user relates to the physical or actual presence of the user. Accordingly, the physical presence 308 may be determined by whether the user is already engaged in a communication (for example is on the telephone), composing a text message, or in a location at which one or more communication devices are not available or operable. As can be appreciated by one of skill in the art, the physical presence of the user can be obtained in various ways. For instance, if the user's telephone line is in use, the user can be assumed to be on the telephone. As a further example, if the user has an email message composition window open, the user can be assumed to be composing a textual message. In addition to input from the status of various communication devices associated with the user, information related to the user's location can also be used as a physical presence 308 input. Location information can be obtained from information related to the location of devices associated with the user. For instance, a personal digital assistant 128f carried by a user within an office building having wireless communication capabilities, for example through Bluetooth connectivity, may be used to determine whether the user is in their own office, in the library, in a colleague's office, or in a boss's office. As an additional example, location information may be obtained from the user's cellular telephone. The physical location 308 may be used to determine the different notification methods that are available in connection with an incoming communication. For instance, if the physical location of the user is determined to be outside of the user's office, a telephone call placed to the user's office telephone 128c could be routed to the user's cellular telephone 128e or directly to voice mail 128i, depending on the various other inputs to the rules engine 232 or on the particular physical location.

The desired accessibility 312 of the user allows the user to select a general accessibility level. For instance, a user may select a high accessibility, according to which the perceived presence of the user will allow all or many incoming communications to be handled by attempting to notify the user of the communication in real-time. Alternatively, the user can select lower accessibility levels, which have the effect of presenting lower levels of presence with respect to incoming communications. Examples of situations in which a user might select lower levels of desired accessibility 312 include when the user needs quiet time in order to complete a project or where the user is speaking with someone who has dropped by. Accordingly, it can be appreciated that the desired accessibility level 312 allows a user to change their accessibility level generally to in part determine the perceived presence of the user calculated by the rules engine 232 in connection with the various other inputs. In accordance with embodiments of the present invention, the desired accessibility level 312 comprises the input that a user is most likely manipulate during the course of the day in order to exert manual control over the presence of the user perceived by contacts.

Environmental factors 316 include actual or scheduled activities of the user, the day of the week, time of day, and whether the day is a normal workday. Accordingly, the input environmental factors 316 may be obtained from information regarding the scheduled activities of the user, for example as may be maintained as part of a calendar application 240 associated with the user. Furthermore, environmental factors can be obtained from general schedule information, such as an enterprise calendar, and selected normal working hours, etc. As can be appreciated from the description provided herein, the physical presence 308, desired accessibility 312, and environmental factors 316 are related to the general availability of a user.

Based on the various inputs 304-316, the rules engine 232 operates to synthesize a level of user presence that is the perceived presence 320 used to determine how the incoming communication is handled. For instance, the rules engine 232 may generate a perceived presence according to which an attempt to notify the user of the incoming communication in real-time is always made when the communication originates from a contact granted a high access level. As a further example, a contact associated with a medium level of access may sometimes be routed to voice mail, while a contact granted a low level of access may always be mounted to voice mail. In addition, the physical presence 308 of a user and environmental factors 316 can be used to determine what communications devices or applications 128 are used in an attempt to notify the user of an incoming communication, and the particular notification method applied by such devices or applications 128.

Figure 4:
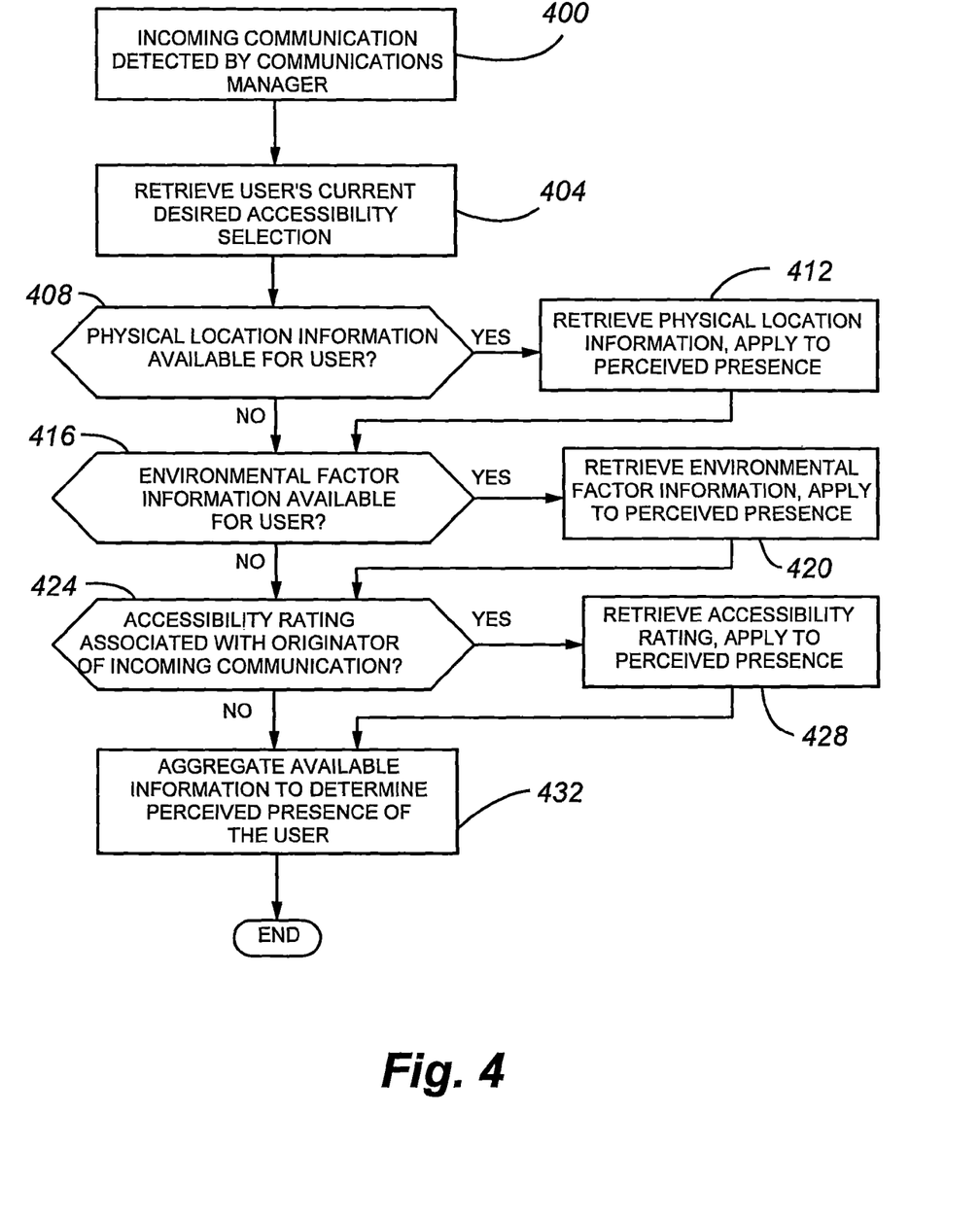
FIG. 4 is a flowchart illustrating the determination of a user's perceived presence in accordance with embodiments of the present invention.

With reference now to FIG. 4, the operation of embodiments of the present invention in connection with generating a perceived presence 320 is illustrated. Initially, at step 400, an incoming communication is detected by the communications network 124, and in particular by the rules engine 232. The user's current desired accessibility selection is then retrieved (step 404). That is the desired accessibility generally specified by the user is retrieved, or a default accessibility selection is retrieved if the user has not set a particular accessibility level (step 404).

At step 408, a determination is made as to whether physical location information for the user is available. If physical location information is available, that information is retrieved and applied as a physical presence input 308 to the rules engine 232 (step 412). After applying available physical location information, or if no physical location information is available, a determination is made as to whether environmental factor information 316 is available for the user (step 416). If environmental factor information is available, that information is retrieved and applied as an environmental factor 316 input to the rules engine 232. After applying available environmental factor 316 information, or if no such information is available, a determination is made as to whether contact accessibility 304 rating information associated with the originator (i.e., the contact) of the incoming communication is available (step 424). Any available accessibility rating information is applied as a contact accessibility input 304 to the rules engine 232 (step 428). After retrieving available accessibility rating information for the contact, or if such information is not available, the available information (i.e., the desired accessibility 312, physical presence 308, environmental factor 316, and/or contact accessibility 304) is used by the rules engine 232 to determine the perceived presence of the user with respect to the incoming communication (step 432). The determined perceived presence determines, for example, whether an attempt to notify the user of the incoming communication will be made in real-time, or whether it will be routed to a mailbox without an attempt at notification in real-time. The determined presence can also be used to control what devices or applications 128 are used to attempt to notify the user of the incoming communication.

Figure 5:
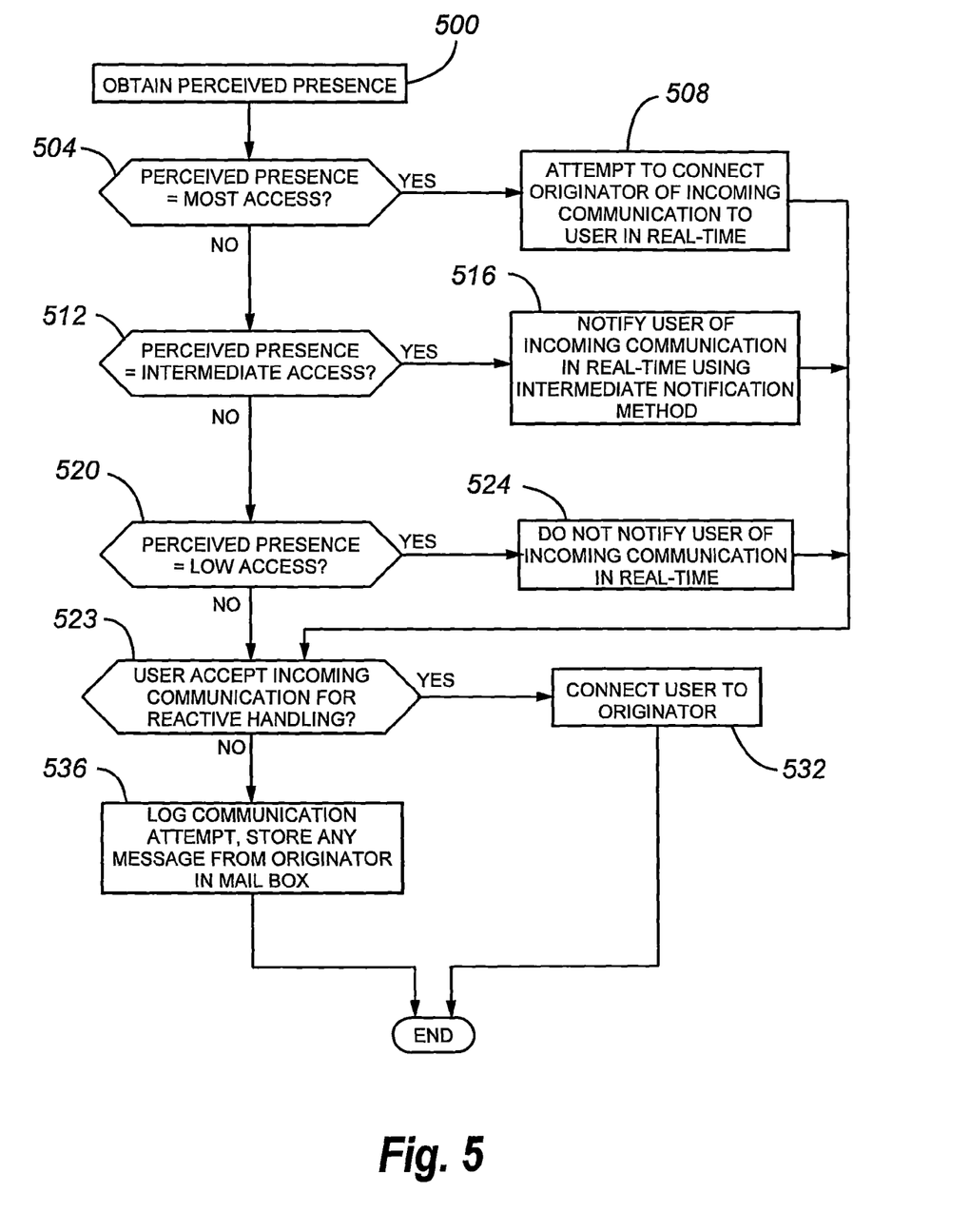
FIG. 5 is a flowchart illustrating the handling of an incoming communication in accordance with embodiments of the present invention.

With reference now to FIG. 5, aspects of the operation of embodiments of the present invention in selecting a notification mode as a result of an aggregated perceived presence are illustrated. Initially, at step 500, the aggregated perceived presence determined with respect to an incoming communication is obtained. For example, a rules engine 232 may operate as described in connection with FIG. 4 to determine the presence of a user that is to be perceived with respect to the incoming communication.

At step 504, a determination is made as to whether the perceived presence is at a highest or most access level. If the determined perceived presence is at a most access level, an attempt to connect the originator of the incoming communication (i.e., the contact) to the user in real-time is made (step 508). Furthermore, attempts to notify the user of the incoming communication can be made using multiple devices or applications 128 to improve the chances of successfully notifying the user. If the perceived presence is not at a most access level, a determination is made as to whether the perceived presence is at an intermediate access level (step 512). If the perceived presence is at an intermediate level, the user is notified of the incoming communication in real-time using an intermediate notification method (step 516). An intermediate notification method applied at step 516 may differ from the notification method applied at step 508 in that an attempt to notify the user of the incoming communication in real-time may be made through the communication device or application 128 to which the incoming communication is actually addressed, rather than being made on or through multiple devices or applications. According to further embodiments, an intermediate notification method may result in an attempt to notify the user through a communication device 128 other than the one to which the incoming communication is actually addressed, but that can notify the user in a less obtrusive way.

If the perceived presence is not at an intermediate level, a determination is then made as to whether the perceived presence is at a low access level (step 520). If the perceived presence is at a low access level, the user is not notified of the incoming communication in real-time (step 524). For example, the incoming communication can be routed to a voice mail immediately. In accordance with embodiments of the present invention, a call may be routed to voice mail, while still providing a relatively unobtrusive notification of the communication to the user. For instance, a ring by a device or application 128 to which an incoming communication comprising a voice telephony call is made may be suppressed, while a textual indication of the incoming communication, such as caller ID information, may be provided by another device or application 128, such as a notification application 128h associated with the user's desktop computer, or with a user's PDA 128f.

If the perceived presence has not been determined to equal a low access level, or after applying notification as indicated at steps 508, 516 or 524, a determination is made as to whether the user has accepted the incoming communication for real-time handling (528). If the user has accepted the incoming communication for real-time handling, for example by accepting a call, the user is connected to the originator or contact (step 532). If the user does not accept the incoming communication for real-time handling, the communication attempt is logged and any message left by the originator or contact is stored in the user's mailbox (step 536). After connecting the user to the originator at step 532, or after logging the communication attempt and storing any associated message at step 536, the procedure may end.

Embodiments of the invention described herein allow a user to manage their accessibility, by controlling the user's level of presence that is perceived by (or granted to) different contacts. More particularly, embodiments of the present invention allow a user to assign different accessibility rankings to different contacts, for example to ensure that some contacts are always or usually able to reach the user, and to ensure that other contacts are never or usually unable to reach the user in real-time. In addition, the user can control a desired accessibility level that is applied with respect to all incoming communications, to allow the user to adjust or control their accessibility throughout the day. Furthermore, as described herein, other factors may be monitored and automatically adjusted, for example to control accessibility or perceived presence as the physical presence and/or environmental factors associated with the user change.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments describes hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A method for managing access to a user, comprising:
    receiving a selection of a first availability level from a first user, wherein said first availability level is selected from a plurality of availability levels;
    receiving a first communication associated with a first contact, wherein said first communication is addressed to said first user;
    determining a level of presence of said first user with respect to said first communication associated with said first contact, wherein said determination is based on:
    said selected first availability level,
    a contact accessibility rating of said first contact,
    a first physical presence of said first user, wherein said first physical presence of said first user is determined from at least one of a status of a communication device associated with said first user, and a location of a device associated with said first user, and
    a first environmental factor associated with said first user, wherein said first environmental factor is obtained from at least one of a calendar application associated with said first user and first user schedule information; and
    based on said determined level of presence, selecting a first mode of handling said first communication.

2. The method of claim 1, further comprising:
    receiving a second communication associated with said first contact, wherein said second communication is addressed to said first user;
    detecting a change in said environmental factor associated with said first user from said first environmental factor to a second environmental factor;
    determining a level of presence of said first user with respect to said second communication associated with said first contact, wherein said determination is based on said selected first availability level, a contact accessibility rating of said first contact, and said second environmental factor associated with said first user; and
    based on said determined level of presence, selecting a second mode of handling said second communication.

3. The method of claim 2, wherein said environmental factor comprises user schedule information and at least one of a time of day, a day of the week, and a status of a day as a holiday or regular work day.

4. The method of claim 1, further comprising:
    receiving a second communication associated with said first contact, wherein said second communication is addressed to said first user;
    detecting a change in a physical presence of said first user from said first physical presence to a second physical presence;
    determining a level of presence of said first user with respect to said second communication associated with said first contact, wherein said determination is based on said selected first availability level, a contact accessibility rating of said first contact, and said second physical presence of said first user; and
    based on said determined level of presence, selecting a second mode of handling said first communication.

5. The method of claim 4, wherein said detecting a change in a physical presence of said first user comprises detecting a change in a location of a device associated with said first user.

6. The method of claim 4, wherein said detecting a change in a physical presence of said first user comprises detecting a change in an availability of a communication channel of a communication device associated with said first user.

7. The method of claim 1, wherein said first mode of handling said first communication comprises notifying said first user that said first communication is being directed to a message repository, and providing said first user an opportunity to answer said first communication in real-time.

8. The method of claim 2, wherein said first mode of handling said first communication comprises allowing a communication device to which said first communication is addressed to ring normally, and wherein said second mode of handling said second communication comprises suppressing an audible ring by a communication device to which said second communication is addressed.

9. The method of claim 1, further comprising:
    compiling a list of contacts associated with said first user; and
    associating a first contact accessibility rating with each contact within said list of contacts.

10. The method of claim 1, further comprising receiving from said first user a selected accessibility rating for a contact.

11. A computational component for performing a method, the method comprising:
    detecting a first incoming communication;
    retrieving a desired user accessibility associated with a first user;
    obtaining: 1) a contact accessibility rating for a first contact associated with said incoming communication; 2) first physical location information associated with said first user, wherein said first physical location information is determined from at least one of a communication status of a communication device associated with said first user, and a location of a communication device associated with said first user; and 3) environmental factor information associated with said first user, wherein said environmental factor information is obtained from at least one of a calendar application associated with said first user and first user schedule information;
    applying said retrieved desired user accessibility and said contact accessibility rating for said first contact, first physical location information associated with said first user, and environmental factor information associated with said first user to a rules engine to determine a level of presence of said first user with respect to said first communication;
    in response to determining a first level of presence, applying a first mode of handling said first communication; and
    in response to determining a second level of presence, applying a second mode of handling said first communication.

12. The method of claim 11, wherein said contact accessibility rating for a first contact is obtained, and wherein said obtained contact accessibility rating for said first contact is applied to determine a level of presence of said first user with respect to said first communication.

13. The method of claim 11, wherein said obtaining said environmental factor information includes:
   accessing a calendar associated with said first user; and
   determining a scheduled status of said first user, wherein said availability of said first user includes a scheduled status of said first user.

14. The method of claim 11, further comprising:
   receiving from said first user an association of a first accessibility rating with a first contact, and
   receiving from said first user an association of a second accessibility rating with respect to a second contact, wherein at said first accessibility level a communication from said first contact over a first communication channel is immediately forwarded to said first user, and wherein at said first accessibility level a communication from said second contact over said first communication channel is not immediately forwarded to said first user.

15. The method of claim 14, wherein an association of an accessibility rating with respect to a third contact is not received from said first user, and wherein said second accessibility rating is associated with said third contact with respect to a communication received from said third contact.

16. The method of claim 11, wherein said computational component comprises a computer readable storage medium containing instructions for performing the method.

17. The method of claim 11, wherein said computational component comprises a logic circuit.

18. An apparatus for filtering communication channels, comprising:
   first means for providing communications associated with a user;
   means for detecting a first communication from a first contact addressed to said first means for providing communications;
   means for determining from a plurality of inputs a perceived presence for application in response to said first communication, said inputs including:
      a) an accessibility rating of said first contact;
      b) a physical presence of said user, wherein said physical presence includes at least one of a status of a user communication device and a location of a user communication device;
      c) a desired accessibility of said user;
      d) an environmental factor associated with said user, wherein said environmental factor includes a scheduled status of said user;
   wherein in response to a first perceived presence a first notification method is applied.

19. The apparatus of claim 18, further comprising:
   means for maintaining a schedule, wherein an input to said means for determining includes an environmental factor associated with said first user, and wherein said environmental factor includes a scheduled status as indicated by said means for maintaining a schedule.

20. The apparatus of claim 18, further comprising:
   means for determining a physical location of a user communication device of said first user, wherein an input to said means for determining includes a physical location of said user communication device of said first user.

21. The apparatus of claim 18, further comprising:
   means for maintaining accessibility ratings for contacts, wherein an input to said means for determining includes an accessibility rating of said first contact.

22. The apparatus of claim 18, further comprising:
   means for maintaining a desired accessibility of said user, wherein an input to said means for determining includes a desired accessibility of said user.

23. The apparatus of claim 18, further comprising:
   second means for providing communications associated with said user, wherein said first notification method comprises notifying said user of said incoming communication through said first means for providing communications and said second means for providing communications.

24. The apparatus of claim 18, further comprising:
   second means for providing communications associated with said user, wherein said first communication is addressed to said first means for providing communications, and wherein said first notification method comprises notifying said user of said incoming communication through said second means for providing communications only.

25. An apparatus for establishing a perceived communications presence of a user, comprising:
   a rules engine;
   a first set of information input to said rules engine, including a contact accessibility rating, wherein said first contact accessibility rating is selected from a set of at least three different contact accessibility rating levels, a physical presence of a first user, wherein said physical presence of said first user is provided by at least one of a status of a communication device associated with said first user and a location of a communication device associated with the first user, a desired accessibility selected by said first user, and an environmental factor associated with said first user, wherein said environmental factor is associated with at least one of a calendar application and schedule information associated with said first user;
   an output from said rules engine, wherein a perceived presence for use in connection with a communication addressed to said first user is determined by said rules engine.

26. The apparatus of claim 25, further comprising:
   a computing platform wherein said rules engine runs on said computing platform.

27. The apparatus of claim 25, further comprising:
   a first communication device associated with said first user, wherein said output from said rules engine controls at least a first operating parameter of said first communication device.

28. The apparatus of claim 27, wherein said at least a first operating parameter of said first communication device comprises operation of a device for notifying said first user of an incoming communication.

29. The apparatus of claim 27, further comprising a second communication device associated with said first user, wherein said output from said rules engine controls at least a first operating parameter of said second communication device.

30. The apparatus of claim 27, wherein said rules engine is running on said first communication device.

31. A method for managing access to a user, comprising:
   receiving a selection of a first availability level from a first user;
   receiving a first communication associated with a first contact, wherein said first communication is addressed to said first user;
   determining a level of presence of said first user with respect to said first communication associated with said first contact, wherein said determination is based on said selected first availability level, a contact accessibility rating of said first contact, and at least one of a first physical presence of said first user and a first environmental factor associated with said first user;

based on said determined level of presence, selecting a first mode of handling said first communication;

monitoring communications addressed to said first user over a first communication channel;

monitoring communications addressed to said first user over a second communication channel;

presenting to said first user a list contacts associated with said monitored communications; and receiving from said first user a selected contact accessibility rating for association with at least some of said listed contacts.

32. A method for managing access to a user, comprising:

receiving a selection of a first availability level from a first user;

receiving a first communication associated with a first contact, wherein said first communication is addressed to said first user;

determining a level of presence of said first user with respect to said first communication associated with said first contact, wherein said determination is based on said selected first availability level, a contact accessibility rating of said first contact, and at least one of a first physical presence of said first user and a first environmental factor associated with said first user;

based on said determined level of presence, selecting a first mode of handling said first communication;

monitoring communications addressed to said first user over a first communication channel;

compiling a list of contacts associated with said monitored communications;

associating a first contact accessibility rating with contacts associated with a first number of communications with said first user that result in real-time communications; and associating a second contact accessibility rating with contacts associated with less than said first number of communications with said first user that result in real-time communications.

* * * * *